US005566361A

United States Patent [19]

Nagai

[11] Patent Number: 5,566,361

[45] Date of Patent: Oct. 15, 1996

[54] ANTENNA OPERATING MECHANISM FOR A PORTABLE RADIO COMMUNICATION APPARATUS

[75] Inventor: Michio Nagai, Tokyo, Japan

[73] Assignee: NEC Corporation, Tokyo, Japan

[21] Appl. No.: 389,614

[22] Filed: Feb. 16, 1995

Related U.S. Application Data

[63] Continuation of Ser. No. 981,315, Nov. 25, 1992, abandoned.

[30] Foreign Application Priority Data

Nov. 27, 1991 [JP] Japan ..................................... 3-311178

[51] Int. Cl.$^{6}$ ................................ H04B 1/38; H01Q 1/24

[52] U.S. Cl. .............................. 455/89; 455/90; 343/702; 343/900

[58] Field of Search ................................ 455/89, 90, 269, 455/289, 348, 351, 97; 343/702, 900, 901, 889, 995, 899

[56] References Cited

U.S. PATENT DOCUMENTS 2,491,629 12/1949 Vernier et al. .......................... 343/901
4,725,845 2/1988 Phillips .................................... 343/702
5,168,278 12/1992 Morita ...................................... 343/702
5,243,355 9/1993 Emmert et al. .......................... 343/702
5,258,772 11/1993 Innaga et al. ........................... 343/702

FOREIGN PATENT DOCUMENTS 2062937 7/1971 France .
3007450 1/1991 Japan .

*Primary Examiner*—Reinhard J. Eisenzopf
*Assistant Examiner*—Thanh Le
*Attorney, Agent, or Firm*—Sughrue, Mion, Zinn, Macpeak & Seas

[57] ABSTRACT

An antenna handling mechanism incorporated in a portable radio communication apparatus and including an antenna which can be pulled out of the casing of the apparatus, as desired. When the antenna is received in the casing, the lower end of thereof is locked by a latch mechanism disposed in the casing. In this condition, as the tip of the antenna is pressed, the latch mechanism unlocks the lower end of the antenna and, at the same time, pushes the antenna out of the top of the casing by a pushing stroke. When the antenna being inserted into the casing reaches a predetermined position, the latch mechanism locks the lower end of the antenna.

7 Claims, 4 Drawing Sheets

FIG.1A
PRIOR ART
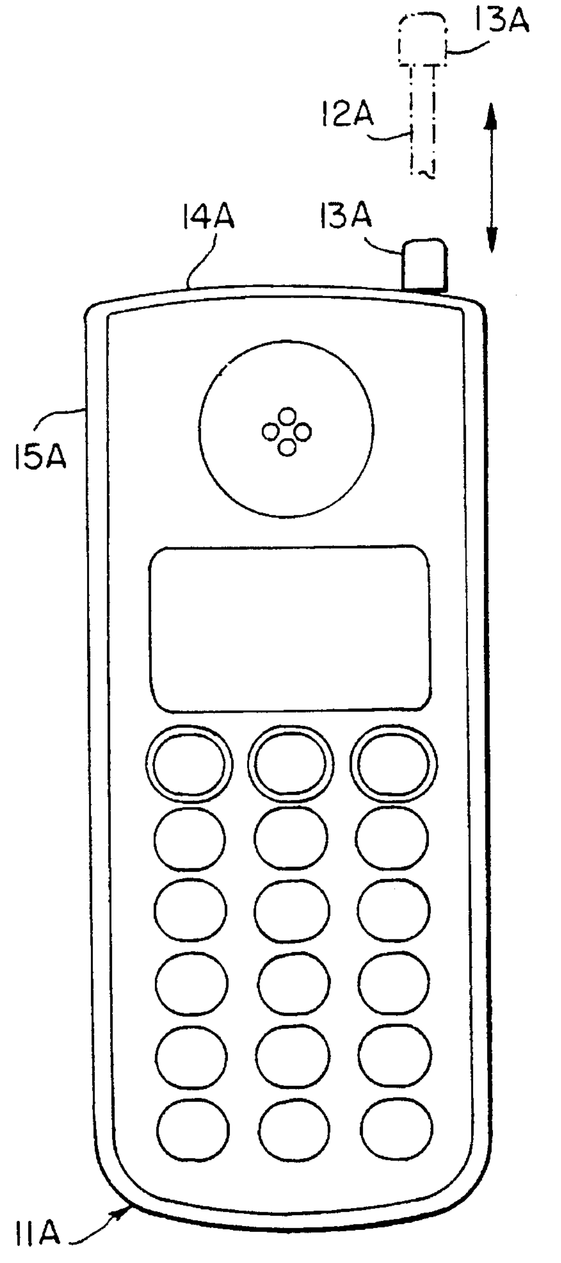
FIG.1B
PRIOR ART
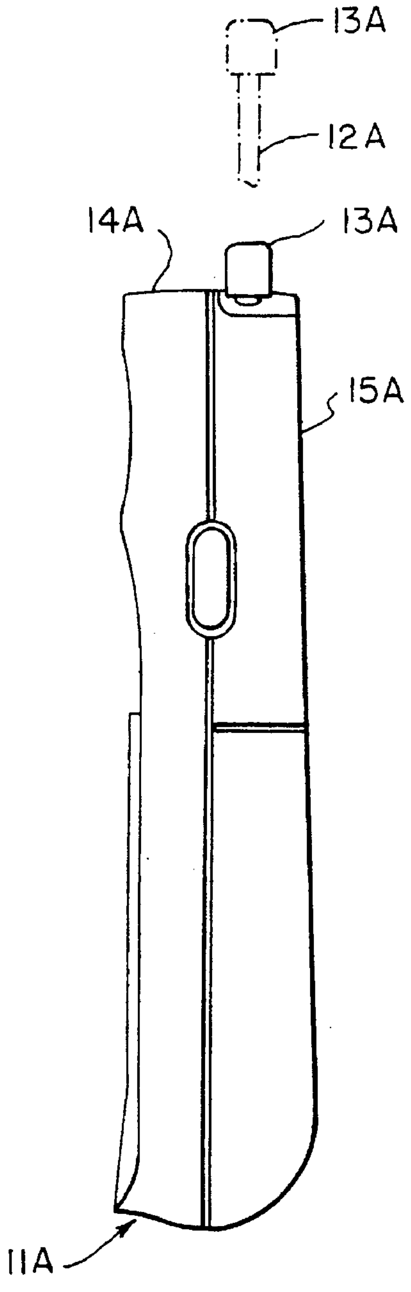
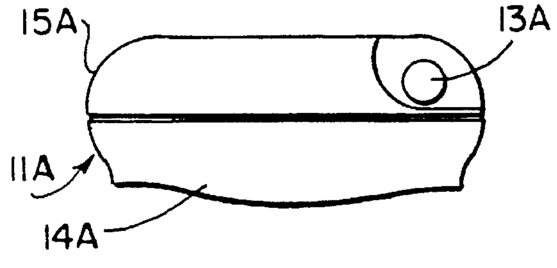
FIG.1C
PRIOR ART

ANTENNA OPERATING MECHANISM FOR A PORTABLE RADIO COMMUNICATION APPARATUS

This is a Continuation of application Ser. No. 07/981,315 filed Nov. 25, 1992, now abandoned.

BACKGROUND OF THE INVENTION

The present invention relates to a portable radio communication apparatus and, more particularly, to an antenna handling mechanism incorporated in such an apparatus and including an antenna which can be pulled out of the casing of the apparatus, as desired.

Various kinds of portable radio communication apparatuses are extensively used today and include an on-board communication apparatus for an automobile telephone system, a radio pager, and a portable radio telephone. Many of such apparatuses are provided with an antenna which can be pulled out of a casing when communication is to be established. This kind of antenna has the tip thereof protruding from the casing to allow the user of the apparatus to easily hold it and pull it out. Specifically, even when the antenna is received in the casing, only the tip thereof protrudes from the top of the casing to promote easy handling of the antenna. However, the problem is that the tip of the antenna protruding from the casing is a hindrance while the apparatus is simply carried by the user, degrading the portability. To eliminate this problem, the casing may be formed with a recess deep enough to accommodate the tip of the antenna to thereby prevent the tip from projecting from the casing when the antenna is received in the casing, as proposed in the past. This kind of scheme, however, brings about another problem that it is troublesome for the user to hold and pull out the tip of the antenna buried in the casing.

SUMMARY OF THE INVENTION

It is, therefore, an object of the present invention to provide an antenna handling mechanism for a portable radio communication apparatus which allows an antenna to be easily pushed into and pulled out of the casing of the apparatus while insuring the portability of the apparatus.

A portable radio communication apparatus of the present invention comprises an antenna capable of being selectively pulled out of the casing of the portable communication apparatus, at least part of the antenna on the casing when the antenna is received in the casing, and a locking mechanism for locking, when the antenna is received in the casing, another part of the antenna for holding the antenna in the casing or unlocking the another part of the antenna when the antenna is pulled out of the casing.

BRIEF DESCRIPTION OF THE DRAWINGS

The above and other objects, features and advantages of the present invention will become more apparent from the following detailed description taken with the accompanying drawings in which:

FIG. 1A is a front view of a conventional portable radio communication apparatus;

FIG. 1B is a section of the apparatus shown in FIG. 1A;

FIG. 1C is a plan view of the apparatus shown in FIG. 1A;

DESCRIPTION OF THE PREFERRED EMBODIMENT

To better understand the present invention, a brief reference will be made to a conventional antenna handling mechanism for a portable radio communication apparatus, shown in FIGS. 1A–1C. As shown, the communication apparatus, generally 11A, has an antenna 12A and a casing 15A. The antenna may be pulled out and pushed into the casing 15A, as desired. Specifically, as shown in FIGS. 1A and 1B, the antenna 12A assumes a position indicated by a solid line when received in the casing 15A or a position indicated by a phantom line when pulled out from the top 14A of the casing 15A. Even when the antenna 12A is received in the casing 15A, the tip 13A thereof protrudes from the top 14A of the casing 15A. In this condition, the user of the apparatus 11A can easily hold the tip 13A of the antenna 12A to pull it out. However, the problem with this type of mechanism is that the tip 13A is a hindrance while the apparatus 11A is simply carried by the user, thus limiting the portability of this kind of apparatus.

Figure 2:
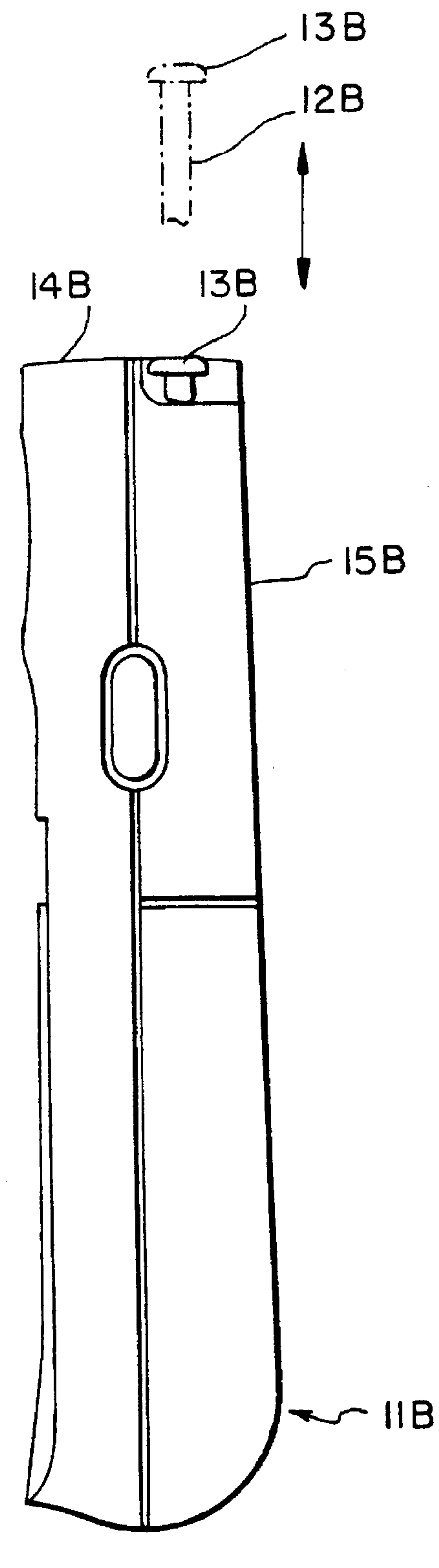
FIG. 2 PRIOR ART
FIG. 2 is a side elevation of another conventional portable radio communication apparatus.
Figure 3A:
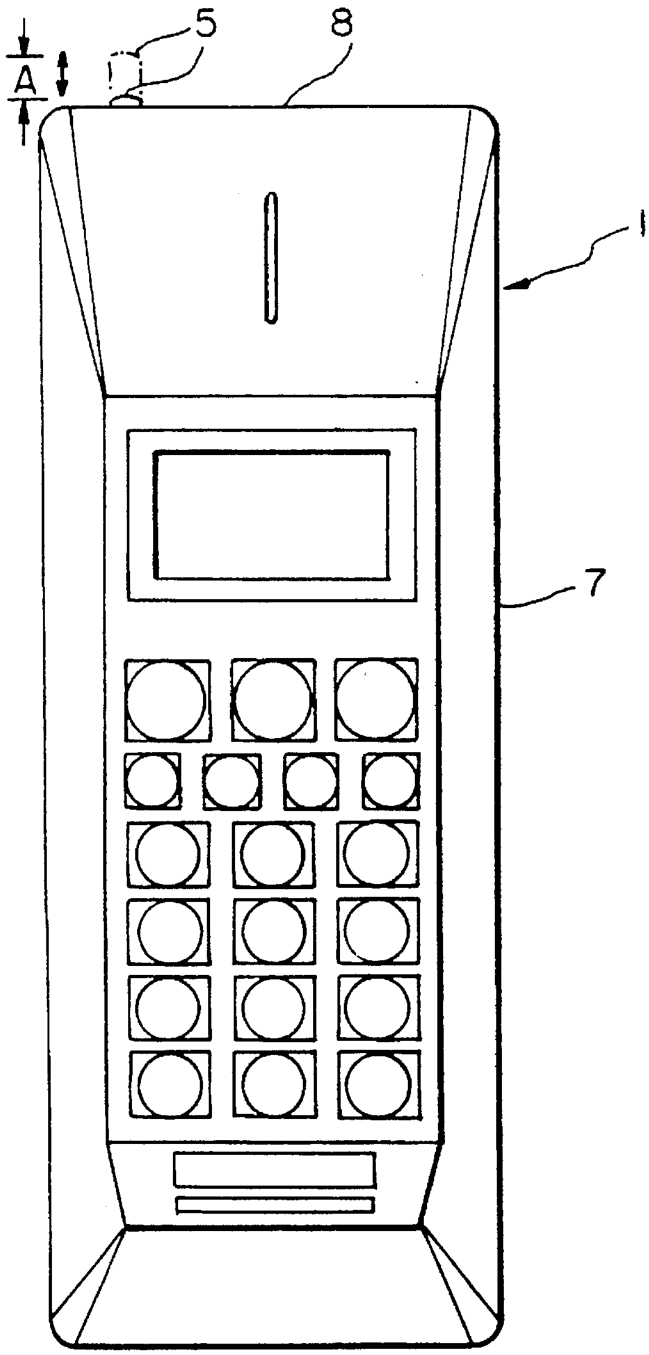
FIG. 3A is a front view of a portable radio communication apparatus to which an antenna handling mechanism embodying the present invention is applied.
Figure 3B:
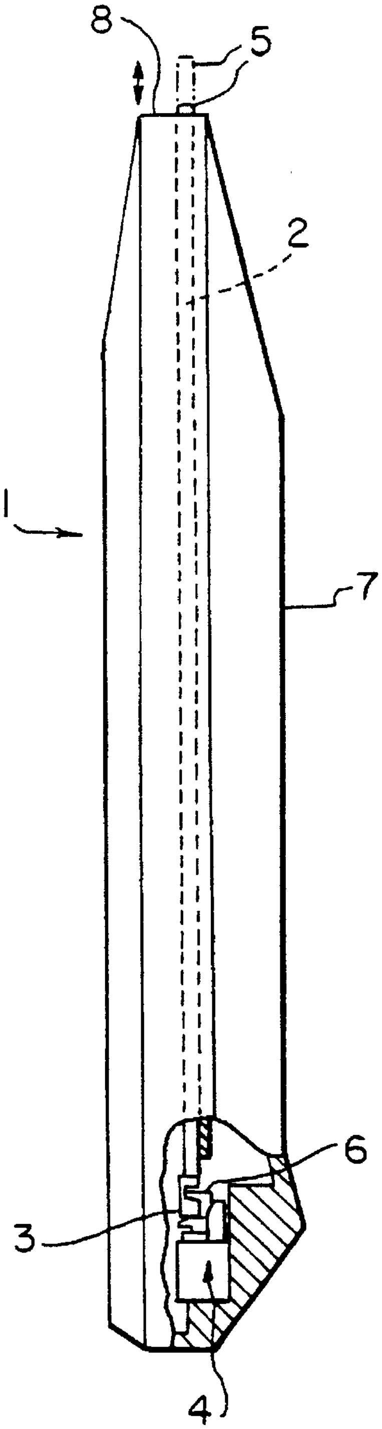
FIG. 3B is a partly sectional side elevation of the antenna handling mechanism.

FIG. 2 shows another conventional portable radio communication apparatus, generally 11B, having an antenna 12B. This antenna 12B assumes a position indicated by a solid line when received in a casing 15B or a position indicated by a phantom line when pulled out of the casing 15B. This apparatus 11B is advantageous over the apparatus 11A in respect of portability since the tip 13B of the antenna 12B does not protrude from the top 14B of the casing 15B when received in the casing 15B. However, the apparatus 11B has a drawback that the user cannot easily hold the tip 13B of the antenna 12B since the tip 13B is buried in the top 14B of the casing 15B.

Referring to FIGS. 3A, 3B, 4A and 4B, a portable radio communication apparatus, in which an antenna handling mechanism embodying the present invention is employed, is shown. The communication apparatus, generally 1, has a rod-like antenna 2, a casing 7, and a latch mechanism 4 supported by the casing 7 and including a locking portion 6. When the antenna 2 is received in the casing 7, the lower end 3 thereof is retained by the locking portion 6 of the latch mechanism 4 (see FIG. 4B). In this condition, the tip 5 of the antenna 1 slightly protrudes from the top 8 of the casing 7. As the user of the apparatus 1 pushes the tip 5 of the antenna 2 toward the top 8 of the casing 7 with a force greater than a predetermined force, the locking portion 6 unlocks the lower end 3 of the antenna 2 and, at the same time, pushes the end 3 toward the top 8 by a distance A which is the pushing stroke of the locking portion 6. As a result, the tip 5 of the antenna 2 is further forced out from the top 8 of the casing 7 by the distance A (see FIG. 4A). Then, the user can easily hold the tip 5 and pull out the antenna 2.

Figure 4A:
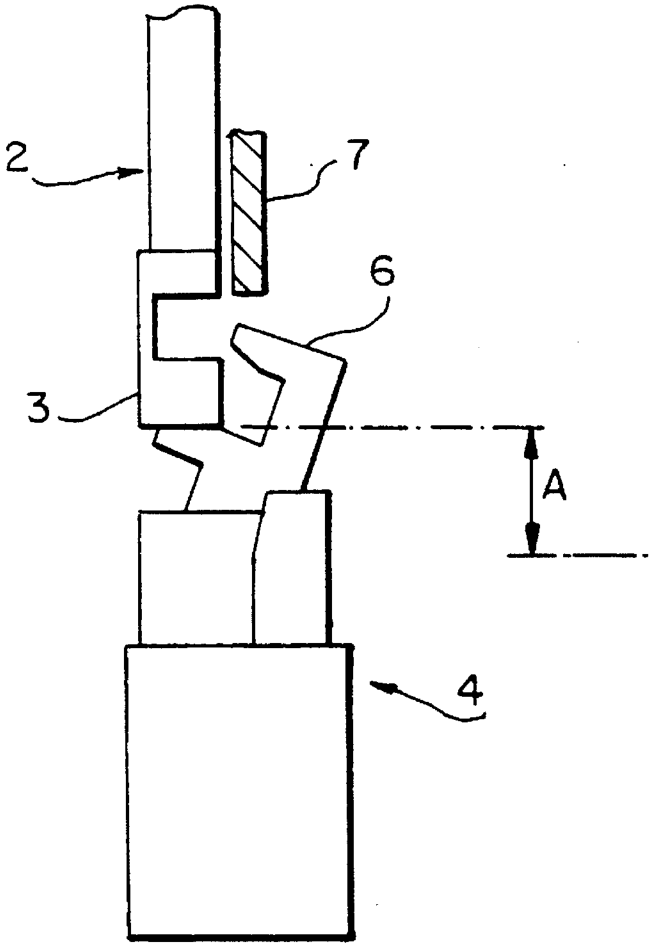
FIGS. 4A and 4B are side elevations showing the mechanism of FIG. 3B in, respectively, a condition wherein an antenna is pulled out of a casing and a condition wherein it is received in the casing.
Figure 4B:
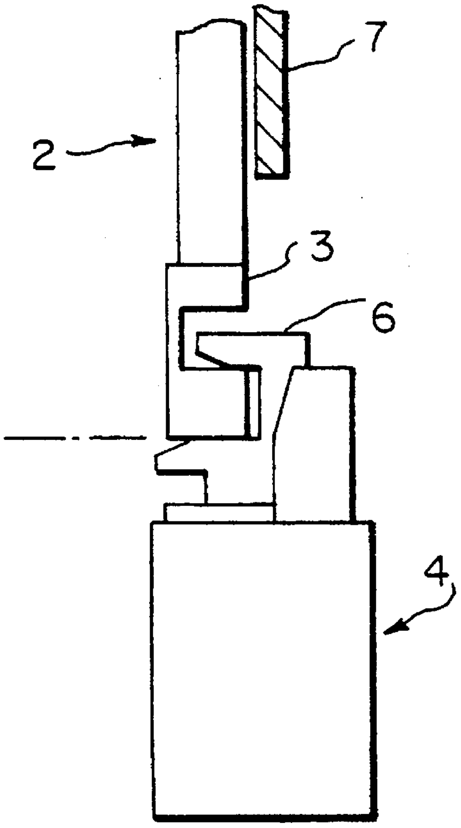

As the antenna 2 pulled out of the casing 7 is sequentially moved back into the casing 7, the lower end 3 thereof presses against the locking portion 6 (see FIG. 4A). When the antenna 2 is further inserted into the casing 7 to a predetermined position relative to the top 8 of the casing 7, i.e., when the lower end 3 reaches a predetermined position relative to the locking portion 6, the end 3 is locked by the locking portion 6. In this manner, the antenna 2 can be received and locked in the casing 7 by a single operation.

The latch mechanism 4 described above may be implemented by any conventional mechanism, e.g., one using a spring and a cam.

In summary, it will be seen that the present invention provides an antenna handling mechanism which allows the user to push and pull an antenna of a portable radio communication apparatus with ease. This advantage is derived from a latch mechanism which causes the tip of the antenna to protrude more than usual when it should be pulled out or locks the lower end of the antenna within the apparatus in response to a single operation. Moreover, since the user does not have to hold the tip of the antenna for pulling it out, it is not necessary to maintain the tip in a protruded position which would limit the portability of this kind of apparatus.

Various modifications will become possible for those skilled in the art after receiving the teachings of the present disclosure without departing from the scope thereof.

What is claimed is:

1. A portable radio communication apparatus comprising:

an antenna for being selectively pulled out of a casing of said portable communication apparatus, at least part of said antenna protruding from said casing when said antenna is received in said casing; and locking means for locking, when said antenna is received in said casing, a lower part of said antenna at an end of said antenna opposite to said part of said antenna protruding from said casing, for holding said antenna in said casing, and for unlocking said lower part of said antenna when said antenna is pulled out of said casing, said locking means including a latch mechanism which pivots about an axis different from a longitudinal axis of said antenna when locking and unlocking said lower part of said antenna, said latch mechanism including a convex portion which pushes said antenna to move said antenna in a direction outward of said casing when unlocking said lower part of said antenna.

2. An apparatus as claimed in claim 1, wherein said latch mechanism unlocks, when the protruding part of said antenna is pressed by a predetermined force, said lower part of said antenna to cause said protruding part to protrude over a predetermined stroke, and locks said lower part when said protruding part is pushed toward said casing by a predetermined amount.

3. An apparatus as claimed in claim 2, wherein said antenna is configured as a rod, said protruding part and said lower part comprising a tip and a lower end of said rod, respectively.

4. An apparatus as claimed in claim 3, wherein said latch mechanism is supported by said casing within said casing.

5. An apparatus as claimed in claim 1, wherein said lower part of said antenna has a concave portion, said antenna is locked when said concave portion of said antenna is fitted into said convex portion of said latch mechanism.

6. A portable radio communication apparatus as claimed in claim 1, wherein said locking means unlocks said lower part of said antenna when said antenna is pushed into said casing prior to being pulled out of said casing, and said locking means pivots about said axis different from said longitudinal axis of said antenna due to a predetermined force applied to said antenna when said antenna is pushed into said casing.

7. A portable radio communication apparatus as claimed in claim 1, wherein said lower part of said antenna directly contacts said locking means to cause said locking means to pivot about said axis different from said longitudinal axis of said antenna when locking and unlocking said lower part of said antenna.

* * * * *